United States Patent
Abu-Ageel

(10) Patent No.: US 7,400,805 B2
(45) Date of Patent: Jul. 15, 2008

(54) COMPACT LIGHT COLLECTION SYSTEM AND METHOD

(76) Inventor: Nayef M. Abu-Ageel, 10 Primrose Way, Apt# 3101, Haverhill, MA (US) 01830

( * ) Notice: Subject to any disclaimer, the term of this patent is extended or adjusted under 35 U.S.C. 154(b) by 0 days.

(21) Appl. No.: 11/534,215

(22) Filed: Sep. 21, 2006

(65) Prior Publication Data

US 2007/0147763 A1   Jun. 28, 2007

Related U.S. Application Data

(63) Continuation-in-part of application No. 10/458,390, filed on Jun. 10, 2003, now Pat. No. 7,306,344, and a continuation-in-part of application No. 11/066,605, filed on Feb. 25, 2005, now Pat. No. 7,301,701, and a continuation-in-part of application No. 11/066,616, filed on Feb. 25, 2005, now Pat. No. 7,318,644, and a continuation-in-part of application No. 11/067,591, filed on Feb. 25, 2005, and a continuation-in-part of application No. 11/317,189, filed on Dec. 22, 2005, now Pat. No. 7,298,940.

(60) Provisional application No. 60/719,155, filed on Sep. 21, 2005.

(51) Int. Cl.
G02B 6/04 (2006.01)
G02B 6/26 (2006.01)
G02B 6/42 (2006.01)
F21V 7/04 (2006.01)

(52) U.S. Cl. .................. 385/120; 385/115; 385/31; 385/33; 385/39; 385/146; 362/610; 362/615; 362/616; 362/617; 362/618; 362/619; 362/621; 362/622; 362/623; 362/624; 362/625; 362/627; 362/628

(58) Field of Classification Search ........... 385/120; 362/615

See application file for complete search history.

(56) References Cited

U.S. PATENT DOCUMENTS

| 5,271,077 | A | | 12/1993 | Brockman et al. |
| 5,349,503 | A | * | 9/1994 | Blonder et al. ............ 362/623 |
| 5,396,350 | A | | 3/1995 | Beeson et al. |
| 5,414,600 | A | | 5/1995 | Strobl et al. |
| 5,428,468 | A | * | 6/1995 | Zimmerman et al. .......... 349/62 |
| 5,430,634 | A | | 7/1995 | Baker et al. |
| 5,498,928 | A | | 3/1996 | Lapatovich et al. |

(Continued)

OTHER PUBLICATIONS

Schnitzer, I. et al., "30% External Quantum Efficiency from Surface Textured, Thin-Film Light-Emitting Diodes", Applied Physics Letter 63, 1993, pp. 2174-2176.

*Primary Examiner*—Frank G Font
*Assistant Examiner*—Ryan Lepisto
(74) *Attorney, Agent, or Firm*—Gavrilovich, Dodd & Lindsey LLP

(57) ABSTRACT

A light collection system includes at least one light source, a light tunnel having reflective walls and a collimating plate at the light output end of the tunnel. The collimating plate includes an optical element array. The element array receives the light emitted from the light source and outputs part of the light at a desired cone angle and reflects the remainder back into the tunnel toward the light source. The light is "recycled" in the tunnel until the light either exits the collection system through the collimating plate or gets absorbed within the collection system.

17 Claims, 20 Drawing Sheets

U.S. PATENT DOCUMENTS

| | | | |
|---|---|---|---|
| 5,521,725 A * | 5/1996 | Beeson et al. | 349/95 |
| 5,598,281 A * | 1/1997 | Zimmerman et al. | 349/5 |
| 5,773,918 A | 6/1998 | Dolan et al. | |
| 5,779,924 A | 7/1998 | Krames et al. | |
| 5,839,812 A * | 11/1998 | Ge et al. | 362/607 |
| 5,839,823 A * | 11/1998 | Hou et al. | 362/327 |
| 6,144,536 A * | 11/2000 | Zimmerman et al. | 361/31 |
| 6,509,675 B2 | 1/2003 | MacLennan et al. | |
| 6,554,456 B1 * | 4/2003 | Buelow et al. | 362/347 |
| 6,560,038 B1 | 5/2003 | Parkyn, Jr. et al. | |
| 6,633,351 B2 * | 10/2003 | Hira et al. | 349/95 |
| 6,734,638 B2 | 5/2004 | Kang et al. | |
| 6,791,270 B2 | 9/2004 | Kim et al. | |
| 6,831,302 B2 | 12/2004 | Erchak et al. | |
| 6,873,119 B2 | 3/2005 | Kim et al. | |

\* cited by examiner

COMPACT LIGHT COLLECTION SYSTEM AND METHOD

CROSS-REFERENCE TO RELATED APPLICATIONS

This application is a continuation-in-part of:
(1) U.S. patent application Ser. No. 10/458,390 filed on Jun. 10, 2003, now U.S. Pat. No. 7,306,344 titled "Light Guide Array, Fabrication Methods, and Optical System Employing Same";
(2) U.S. patent application Ser. No. 11/066,605, titled "Compact Polarization Conversion System for Optical Displays," filed on Feb. 25, 2005 now U.S. Pat. No. 7,301,701;
(3) U.S. patent application Ser. No. 11/066,616, titled "Compact Projection System Including a Light Guide Array," filed on Feb. 25, 2005 now U.S. Pat. No. 7,318,644;
(4) U.S. patent application Ser. No. 11/067,591, titled "Light Recycler and Color Display System Including Same," filed on Feb. 25, 2005; and
(5) U.S. patent application Ser. No. 11/317,189, titled "Light Recovery System and Display Systems Employing Same", filed on Dec. 22, 2005 now U.S. Pat. No. 7,298,940.

This application also claims the benefit of U.S. Provisional Application No. 60/719,155 filed on Sep. 21, 2005.

This application is also related to the following patent applications:
(1) U.S. Patent Application No. 60/719,109, titled "Method and System for LED Light Extraction Using Optical Elements", filed on Sep. 21, 2005; and
(2) U.S. patent application Ser. No. 11/232,310, titled "Method and Apparatus for Reducing Laser Speckle", filed on Sep. 21, 2005.

The subject matter of all of the aforementioned applications is hereby incorporated by reference as though set forth herein in full.

TECHNICAL FIELD

The invention relates generally to systems for collecting and condensing electromagnetic radiation, such as light. More particularly, the disclosure relates to a system for providing a high radiance to a small target such as a display panel in a projection system.

BACKGROUND

Electromagnetic radiation such as light can be collected and condensed using imaging or non-imaging systems. An imaging system produces an image of an arc at a certain location in an optical path. A non-imaging system does not produce an image of an arc, but delivers an optical beam with a certain area, aspect ratio and cone angle.

A common method for light collection is based on a system using a parabolic or ellipsoid reflector of the imaging or non-imaging type. FIG. 1A shows a prior art lamp/reflector system 10 in which a lamp 12 is placed at a first focus of an ellipsoid reflector 11. The ellipsoid reflector 11 focuses the light beam 13 into a second focus 14 located on the optical axis 5. A target (not shown) is usually placed at this second focus 14.

FIG. 1B shows another prior art lamp/reflector system 20 in which a lamp 22 is placed at a focus of a parabolic reflector 21. The parabolic reflector 21 delivers a collimated light beam 23 parallel to an optical axis 15. A focusing lens (not shown) can be used to collect the collimated beam 23 and focus it into a target (not shown) located somewhere on the optical axis 15.

Both systems shown in FIGS. 1A-1B are on-axis systems, since the components are aligned along an optical axis. Systems based on off-axis configurations are also known. For example, U.S. Pat. Nos. 5,414,600 and 5,430,634 describe off-axis collection systems of the imaging type. Non-imaging collection systems are discussed, for example, in U.S. Pat. No. 5,271,077 to Brockman, Kacia et al. and U.S. Pat. No. 6,554,456 to Buelow et al.

Non-imaging light collection systems have been described in U.S. Pat. No. 5,773,918 to Dolan et al. and U.S. Pat. No. 6,509,675 to MacLennan et al. In such systems, a reflective coating is applied directly to the bulb surface of an electrodeless lamp (and sometimes a reflective jacket surrounds the bulb) leaving a port open in the reflective coating (or the reflective jacket) to form an aperture. Light exits the collection system through the aperture and can be collimated via known imaging or non-imaging optics to obtain the desired cone angle. These collection systems do not provide a way to control the spatial distribution of light in terms of angle and intensity at each point across the aperture. In addition, the Dolan and MacLennan patents focus on electrodeless lamps and do not provide effective means to apply such collection schemes to electroded lamps.

Many known electromagnetic radiation collection systems suffer from the following problems. First, many of these systems are relatively large, making them less attractive for many applications such as portable projection display systems. Second, these systems provide limited control over the spatial distribution of delivered light in terms of intensity and angle. Third, due to the large optical aberrations typical of these reflector types, etendue (angular extent) of the light beam is not preserved in most cases, leading to radiation losses at the target. Finally, many of these systems collect only part of the light emitted from a source. Specifically, they collect those light rays that strike the reflector after being emitted from the source. Light rays that do not strike the reflector typically do not get collected, and are thus wasted.

Therefore, there is a need for compact, lightweight, and efficient light collection system that provides control over spatial distribution of light in terms of intensity and angle over a certain target area, such as the active area of a display panel.

SUMMARY

It is an advantage of the present invention to provide a compact, light weight, and efficient light collection system capable of producing a light beam having a desired cross-section and spatial distribution of light, in terms of intensity and angle. Such a light collection system can efficiently couple light from sources having different sizes and shapes into targets of various shapes and sizes. For example, using the collection systems disclosed herein, arc lamps having arc sizes of more than 1 mm long can be efficiently coupled to small illumination targets, thus, enabling the use of long arc lamps that are less expensive and have longer lives in projection systems.

In accordance with an exemplary embodiment of the invention, optical element arrays and light guides are used to form a collection system this is capable of providing a desired spatial distribution of light in terms of angle and intensity over a certain target area, such as that of a display panel. The collection system includes at least one light source, a light tunnel having reflective walls and a collimating plate at the light output end of the tunnel. The collimating plate includes an optical element array. The micro-element array receives the light emitted from the light source and outputs part of the light at a desired cone angle and reflects the remainder back into the tunnel toward the light source. The light is "recycled" in the tunnel until the light either exits the collection system through the collimating plate or gets absorbed within the collection system.

In addition to the embodiments described herein, other embodiments, features, aspects, advantages, systems and methods of the invention will be or will become apparent to one with skill in the art upon examination of the following drawings and detailed description. It is intended that all such additional embodiments, features and advantages be included within this description, be within the scope of the invention, and be protected by the accompanying claims.

BRIEF DESCRIPTION OF THE DRAWINGS

It is to be understood that the drawings are solely for purposes of illustration and not as a definition of the limits of the invention. Furthermore, it is to be understood that the drawings are not necessarily drawn to scale and that, unless otherwise stated, they are merely intended to conceptually illustrate the structures and methods described herein.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1A:
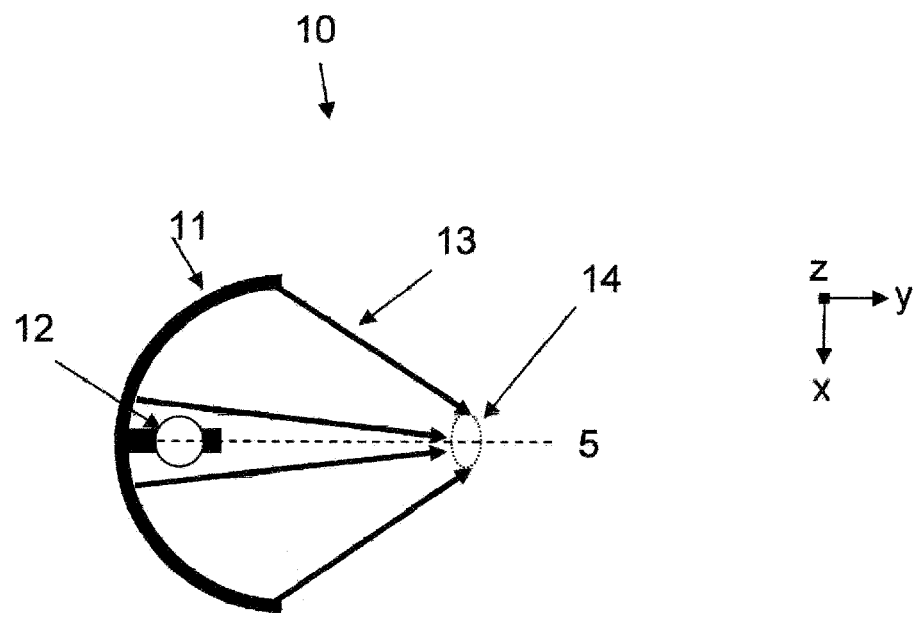
FIG. 1A is a cross-sectional view of a prior art collection system, which utilizes an ellipsoid reflector for light collection.
Figure 1B:
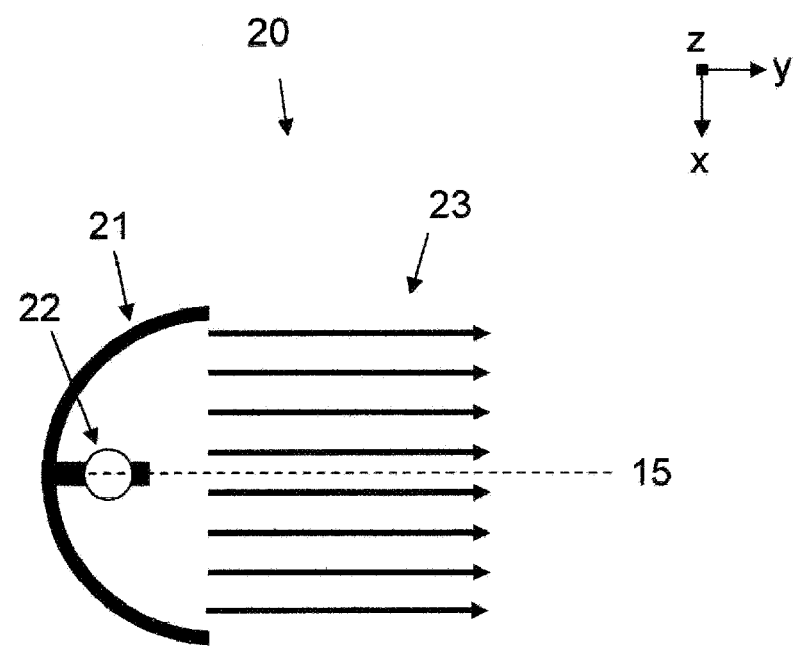
FIG. 1B is a cross-sectional view of a second prior art collection system, which utilizes a parabolic reflector for light collection.
Figure 2A:
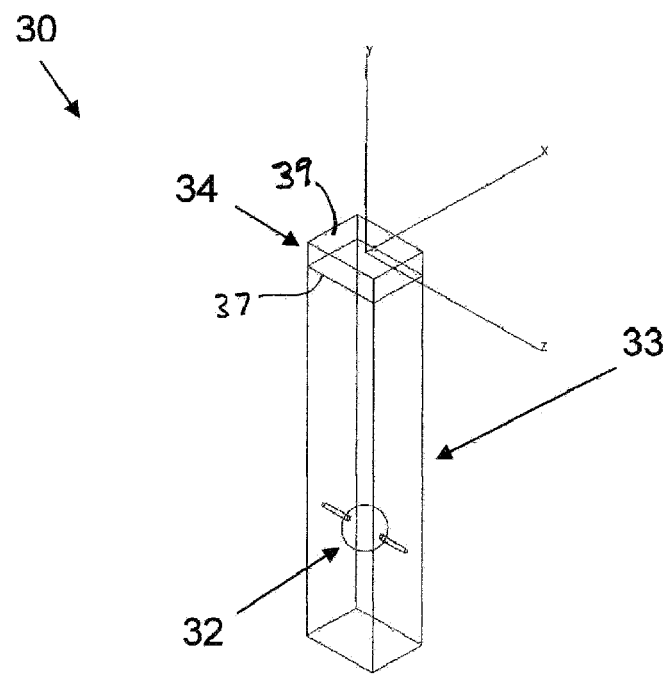
FIG. 2A shows a perspective view of a collection system utilizing a light tunnel and a collimating plate for light collection.

FIG. 2A shows a perspective view of a collection system 30 utilizing one light source 32, a tunnel 33 and a collimating plate 34. As shown in FIG. 2D, the bulb 32a of the radiation source 32 is placed within the tunnel 33 so that most of emitted light is guided within the light tunnel 33. The support rod (or electrodes) 32b of the bulb 32a extend through two of the tunnel sidewalls 33b (see FIG. 2B). The radiation source 32 can be a filament lamp or an arc lamp such as a xenon lamp, a metal halide lamp, an HID lamp or a mercury lamp. Electrodeless and electroded lamps can be used as light sources.

Figure 2B:
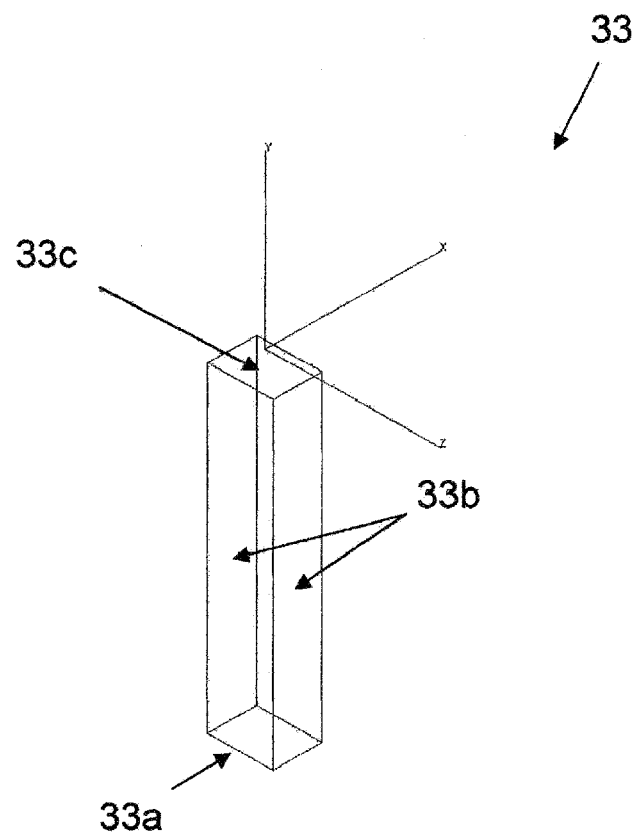
FIG. 2B shows a perspective view of the light tunnel shown in FIG. 2A.

As shown in FIG. 2B, the hollow tunnel 33 consists of four sidewalls 33b and a back side 33a, which are coated with a highly reflective coating. The coating can be specular, diffuse reflector or combinations of both (i.e., part of the sidewalls has diffuse and other parts have specular reflector). The exit face 33c of the tunnel 33 is open. The collimating plate 34 is attached to the exit face 33c of the tunnel 33 as shown in FIG.

2A. The collimating plate 34 receives light exiting the tunnel 33 at its light input surface 37 and outputs collimated light from its light output surface 39.

Although the tunnel 33 is shown as being rectangular shaped, it can have other shapes, such as being cylindrical.

Figure 2C:
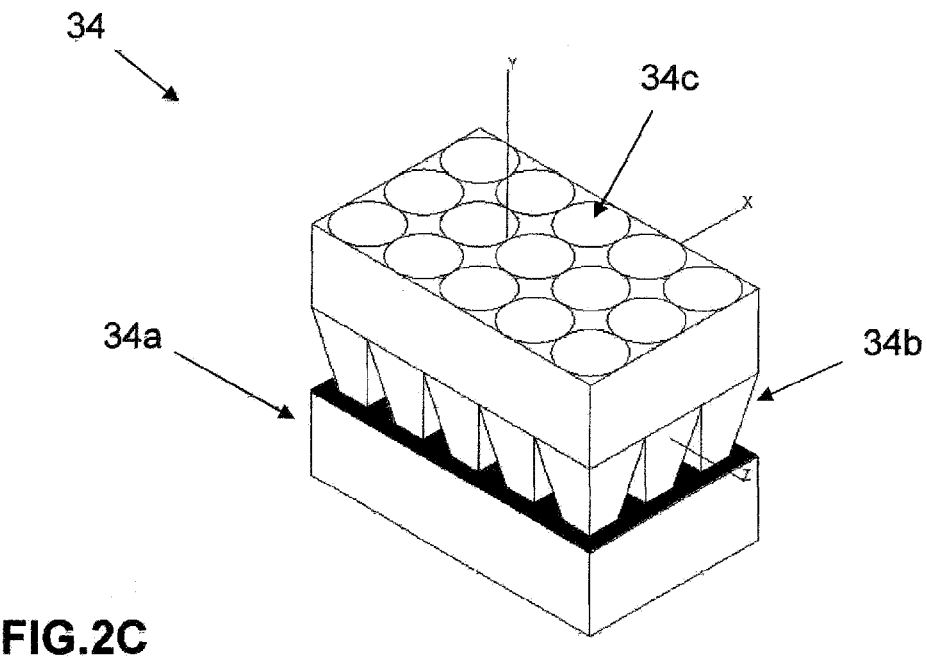
FIG. 2C shows a perspective view of the collimating plate shown in FIG. 2A.
Figure 2D:
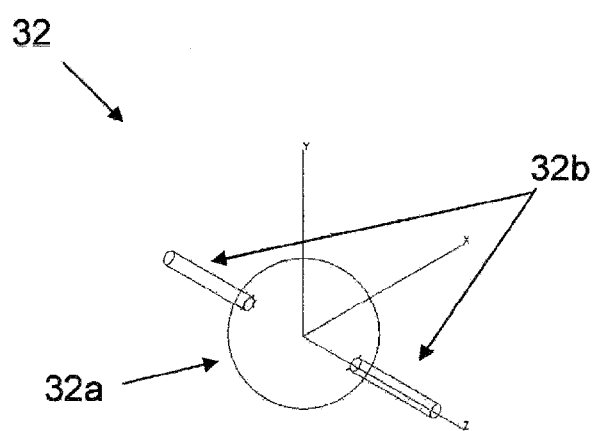
FIG. 2D shows a perspective view of the light source shown in FIG. 2A.

FIG. 2C shows a perspective view of the collimating plate 34, which consists of an aperture plate 34a, micro-waveguide array 34b and a micro-lens array 34c. Each micro-lens corresponds to a micro-waveguide and a micro-aperture. As shown in FIG. 2G, the aperture array 34a comprises a plate made of a highly-transmissive material 34a1 to electromagnetic radiation with a patterned reflective coating 34a2 applied to its top surface. A perspective view of the micro-waveguide array 34b and micro-lens array 34c is shown in FIG. 2H. Both arrays 34b and 34c are made on a single glass plate. A cross-sectional view of the aperture array 34a, micro-waveguide array 34b and micro-lens array 34c is shown in FIG. 2F.

Design parameters of each optical element (e.g., micro-waveguide, micro-lens, aperture or micro-tunnel) within an array 34a, 34b and 34c include shape and size of entrance and exit apertures, depth, sidewalls shape and taper, and orientation. The elements within an array 34a, 34b and 34c can have uniform, non-uniform, random or non-random distributions and range from one element to millions with each element being distinct in its design parameters. The size of the entrance/exit aperture of each element is preferably greater than or equal to 5 µm in case of visible light in order to avoid light diffraction phenomenon, in a range of about 5 µm-50 µm. However, it is possible to design elements with sizes of entrance/exit aperture being less than 5 µm. In such case, the design should consider the diffraction phenomenon and behavior of light at such scales to provide homogeneous light distributions in terms of intensity, viewing angle and color over a certain area. Such elements can be arranged as a one-dimensional array, two-dimensional array, circular array and can be aligned or oriented individually.

In addition, the collimating plate 34 can have a smaller size than the exit face 33c of the tunnel 33 (see FIG. 2B) and its shape can be rectangular, square, circular or any other arbitrary shape.

The operation of the light collection system 30 is described as follows. Part of the electromagnetic radiation emitted by the source 32 travels directly toward the collimating plate 34 and the some travels toward the back side of the tunnel where it gets reflected toward the collimating plate 34. This radiation is guided within the light tunnel 33 until it impinges on the collimating plate 34, which passes part of this electromagnetic radiation through the entrance apertures 34b1 (see the exploded view of FIG. 2F) of the micro-waveguide array 34b. The remainder of the radiation gets reflected off of the reflective coating 34a2 (see FIG. 2F) of the aperture array 34a and travels toward the source 32. Most of this reflected light impinges on the back side of the tunnel 33 and gets reflected back toward the collimating plate 34. This process continues until most of the radiation passes through the collimating plate 34.

Radiation received by the collimating plate 34 experiences total internal reflection off of the micro-waveguides' sidewalls 34b2 within the micro-waveguides of array 34b and becomes highly collimated as it exits array 34b through the exit apertures 34b3 of the micro-waveguides. This collimated radiation enters and exits the micro-lens array 34c via refraction and become even more collimated. In addition to this high level of collimation, collection system 30 provides control over the spatial distribution of output radiation in terms of intensity and cone angle at the location of each element. The spatial distribution of output radiation can be varied by changing the arrangement, uniformity, designs, number and density of the optical elements included in the collimating plate 34.

Since the collection system 30 is a closed one, the reflected light beam gets reflected off of the reflective coating at the back side of the tunnel and travels back toward the micro-waveguide array. The light is recycled in the tunnel until the light either exits the collection system through the collimating plate or gets absorbed within the collection system.

FIGS. 3A-3G show collimating plates 44, 54, 64 with alternative designs and structures. These alternative collimating plates 44, 54, 64 can be substituted for the collimating plate 34 shown in the collection systems 30, 130, 330, 530, 630 disclosed herein.

Figure 3A:
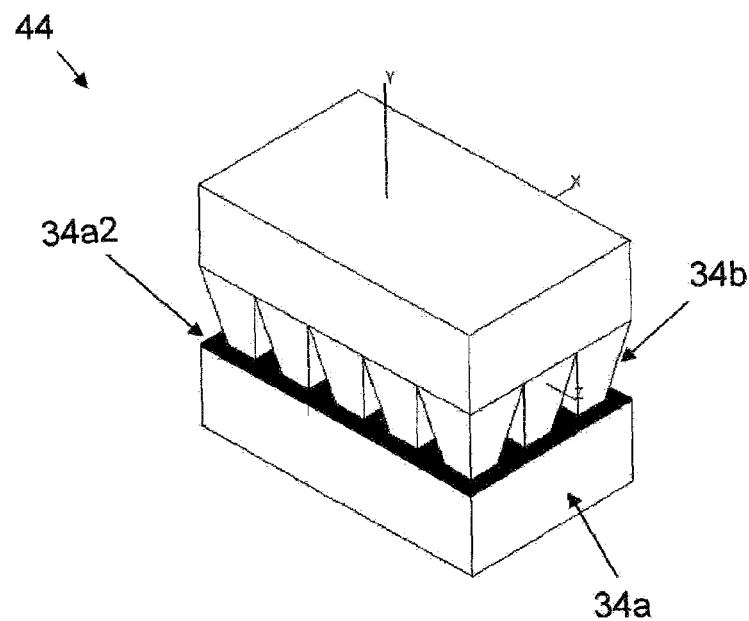
FIG. 3A shows a perspective view of a collimating plate consisting of an aperture array and a micro-waveguide array (with no micro-lens array).
Figure 3B:
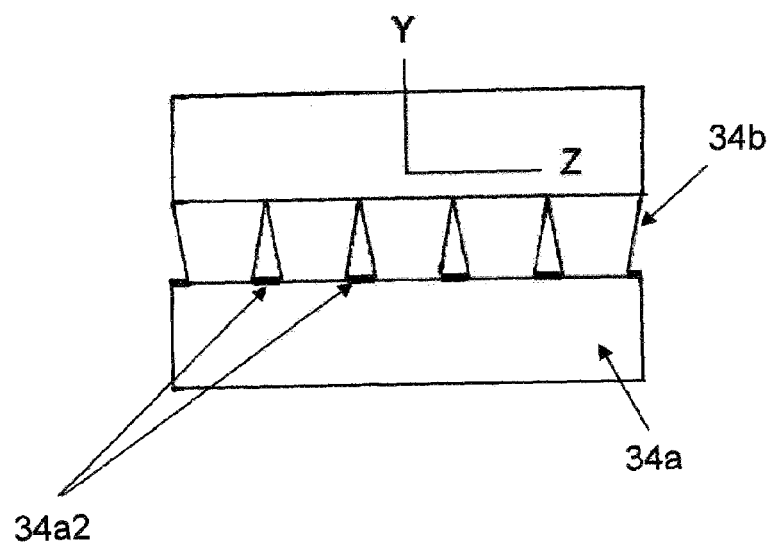
FIG. 3B shows a cross-sectional view of the collimating plate of FIG. 3A.
Figure 3C:
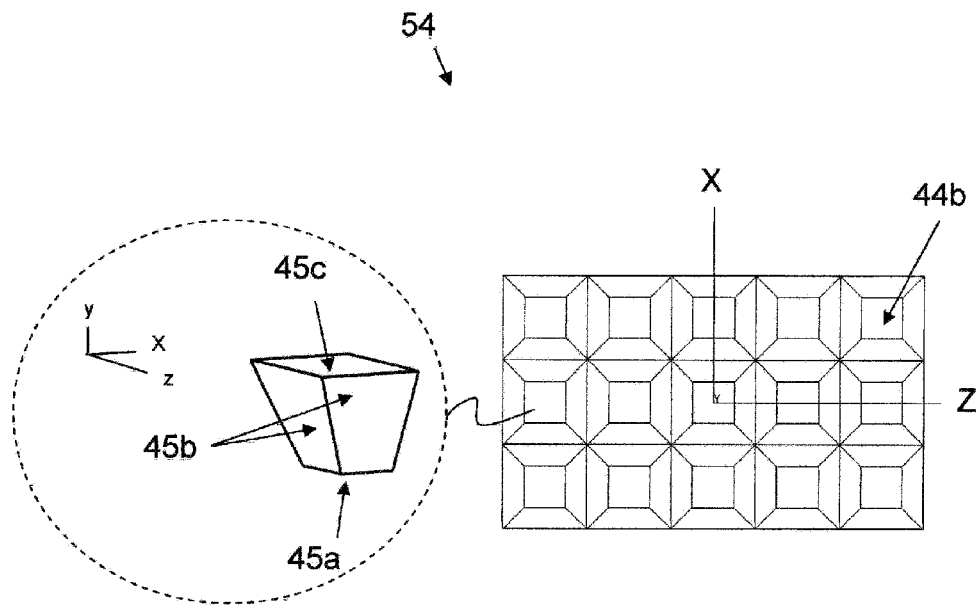
FIG. 3C shows a top view of a collimating plate utilizing hollow micro-tunnel and aperture arrays for light collimation.
Figure 3D:
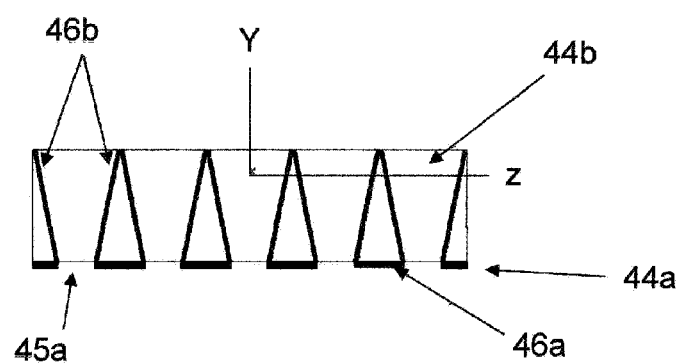
FIG. 3D shows a cross-sectional view (in the yz-plane) of the collimating plate of FIG. 3C.

FIGS. 3A and 3B show perspective and cross-sectional views of a collimating plate 44 consisting of a micro-waveguide array 34b and an aperture array 34a. FIG. 3C and 3D show top and cross-sectional views of a collimating plate 54 consisting of an aperture array 44a integrated with a hollow micro-tunnel array 44b on a single plate. The internal sidewalls 45b (exploded view of FIG. 3C) of each micro-tunnel are coated with a highly reflective coating 46b (FIG. 3D) of the specular type. The aperture array 44a consists of a reflective coating 46a (can be specular or diffuse type) applied to the areas surrounding the entrance aperture 45a of each micro-tunnel. In this type of collimating plate 54, the radiation enters through the entrance aperture 45a of each micro-tunnel, gets reflected off of the reflective coating 46b applied to the micro-tunnel's sidewalls 45b and exits the exit aperture 45c of each micro-tunnel as a more collimated radiation. The remainder of received radiation gets reflected by the reflective aperture array 44a. The advantages of collimating plate 54 are compactness and high transmission efficiency of radiation without the need for antireflective (AR) coatings at the entrance 45a and exit 45c apertures of its micro-tunnels.

The collimating plate 54 shown in FIGS. 3C-D is discribed in U.S. patent application Ser. No. 10/458,390 filed on Jun. 10, 2003, titled "Light Guide Array, Fabrication Methods, and Optical System Employing Same", which is incorporated by reference.

Figure 3E:
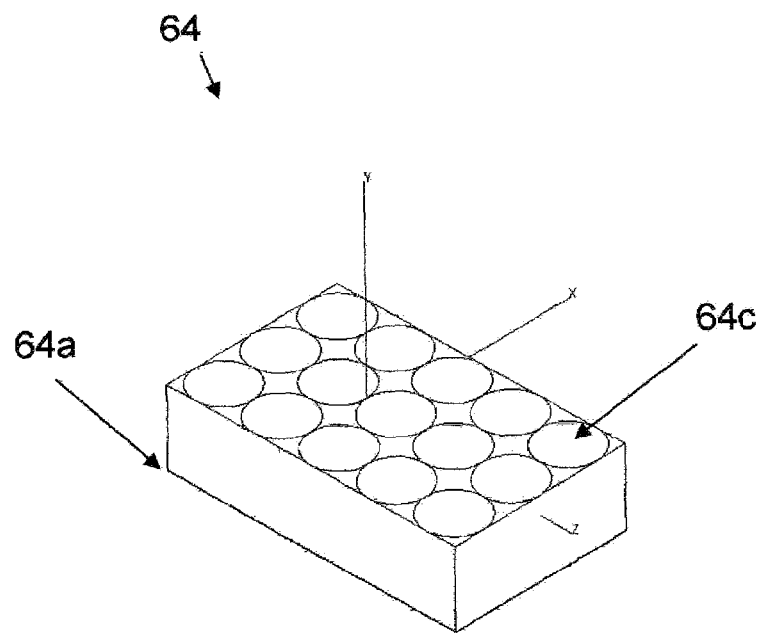
FIG. 3E shows a perspective view of a collimating plate consisting of an aperture array and a micro-lens array (with no micro-waveguide array).
Figure 3F:
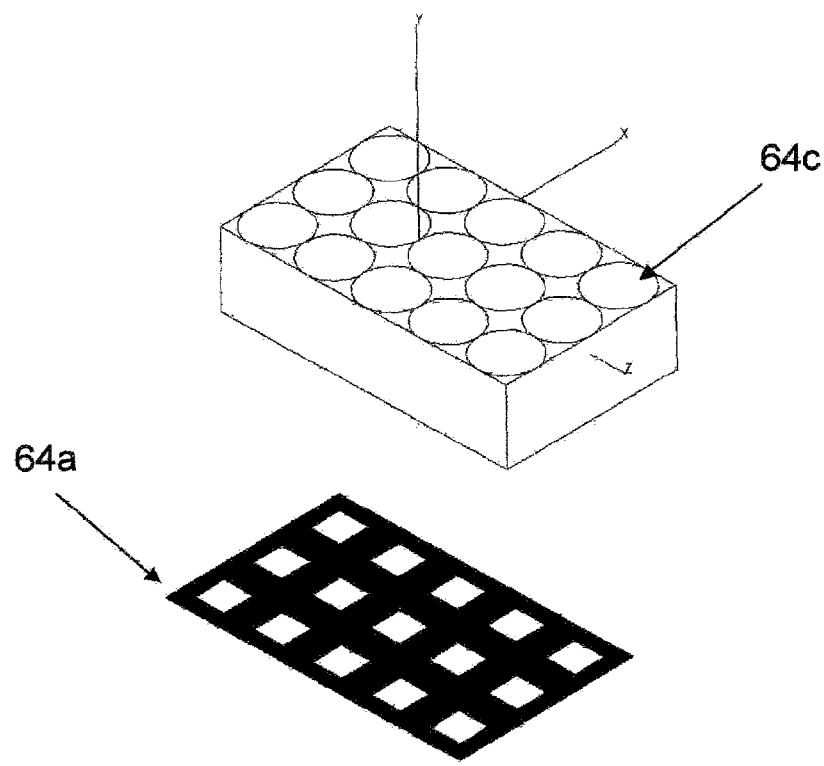
FIG. 3F shows an exploded view of the collimating plate of FIG. 3E.
Figure 3G:
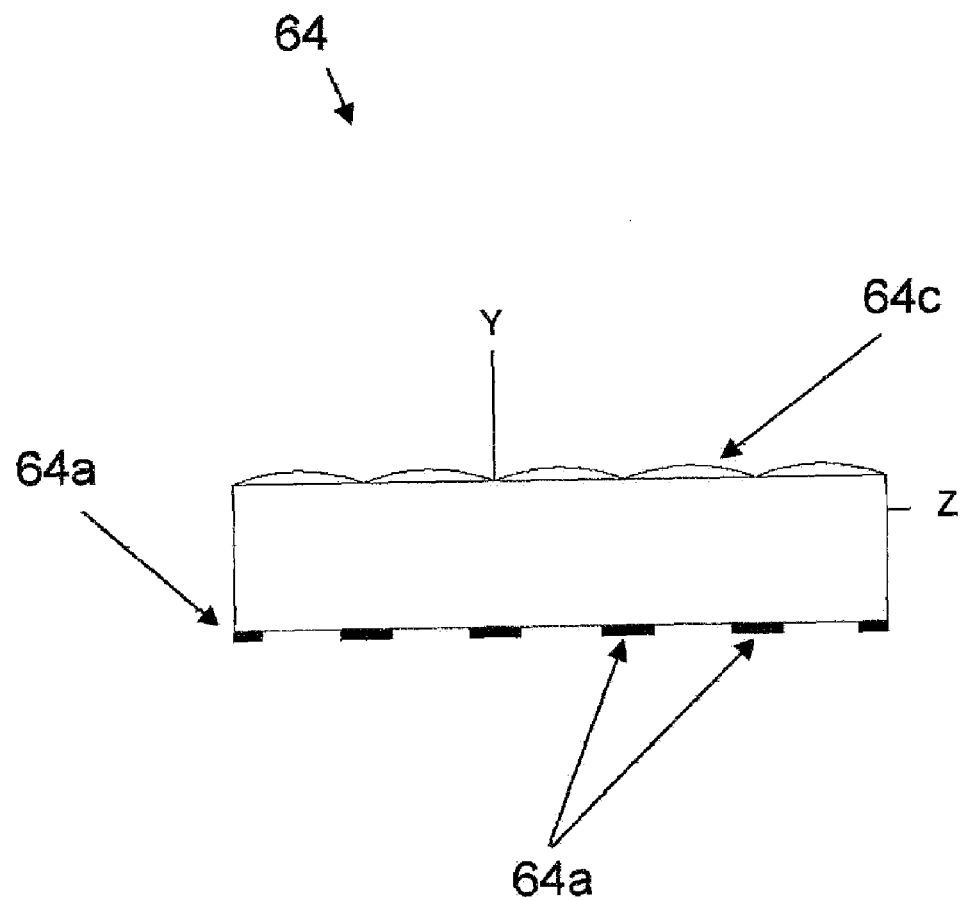
FIG. 3G shows a cross-sectional view (in the yz-plane) of the collimating plate of FIG. 3E.

FIGS. 3E, 3F and 3G show perspective, exploded and cross-sectional views of a collimating plate 64 consisting of an aperture array 64a and a micro-lens array 64c made on a single plate. In this case, the micro-lens array 64c performs the collimation function of delivered radiation via refraction.

U.S. Pat. Nos. 5,598,281 and 5,396,350, which are hereby incorporated by reference, discuss various designs of additional collimating plates which can be used in the collection systems disclosed herein. However, micro-waveguide arrays of these two patents required the application of a specular reflective coating on the sidewalls of individual solid micro-waveguides. Such a requirement is necessary for their intended backlight applications where the cone angle of received light is too large to be collimated via total internal reflection.

Figure 4A:
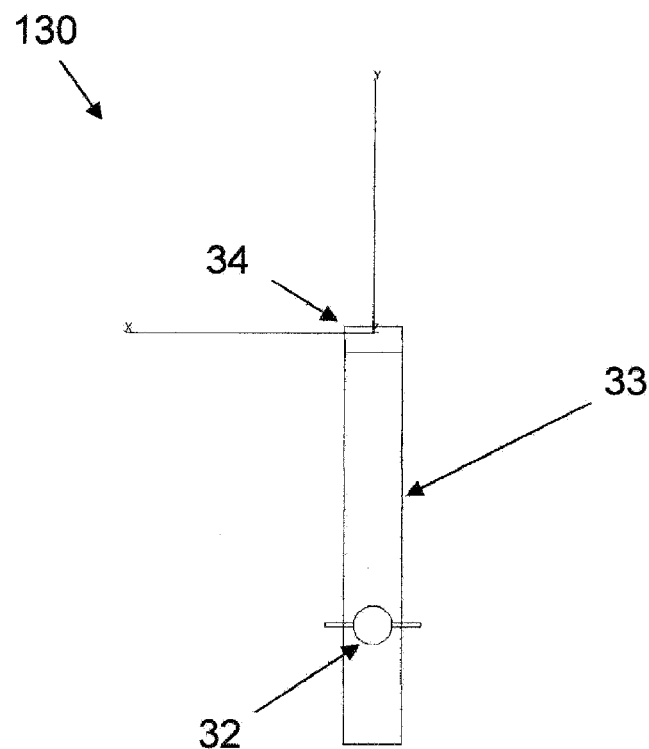
FIG. 4A shows a cross-sectional view (in the xy-plane) of a collection system utilizing a collimating plate, a light tunnel and a light source.
Figure 4B:
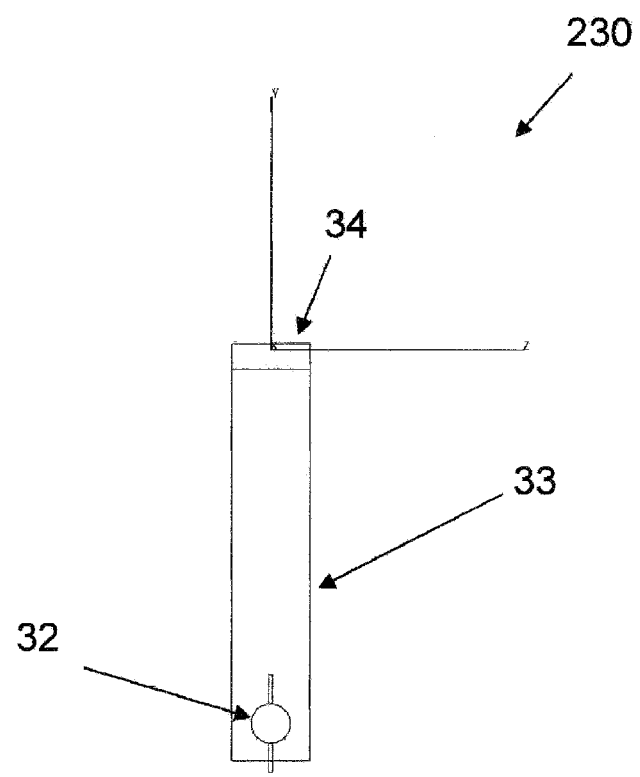
FIG. 4B shows a cross-sectional view (in the xy-plane) of a collection system utilizing a collimating plate, a light tunnel and a light source attached to the back side of the tunnel.

Two additional implementations of collection systems 130, 230 are shown in FIGS. 4A-B, respectively.

Figure 2E:
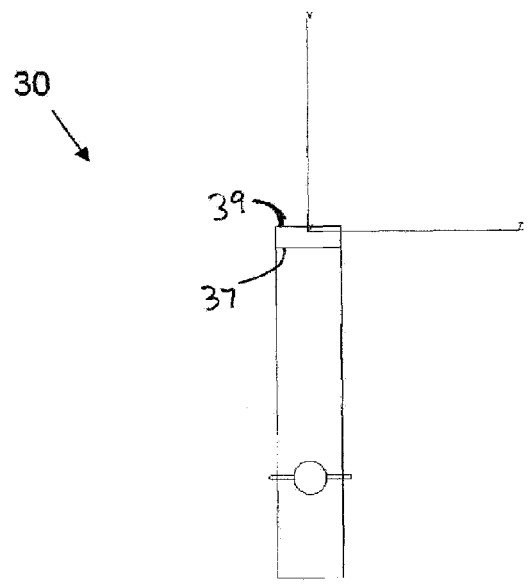
FIG. 2E shows a cross-sectional view of the collection system of FIG. 2A.
Figure 2F:
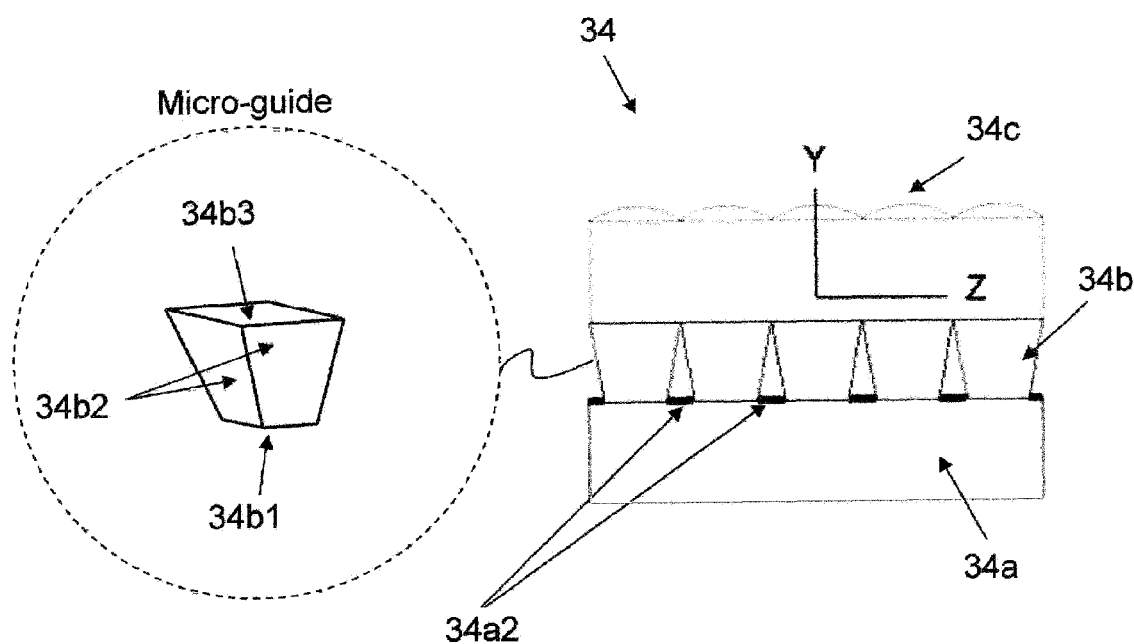
FIG. 2F shows a cross-sectional view of the collimating plate shown in FIGS. 2A and 2C.
Figure 2G:
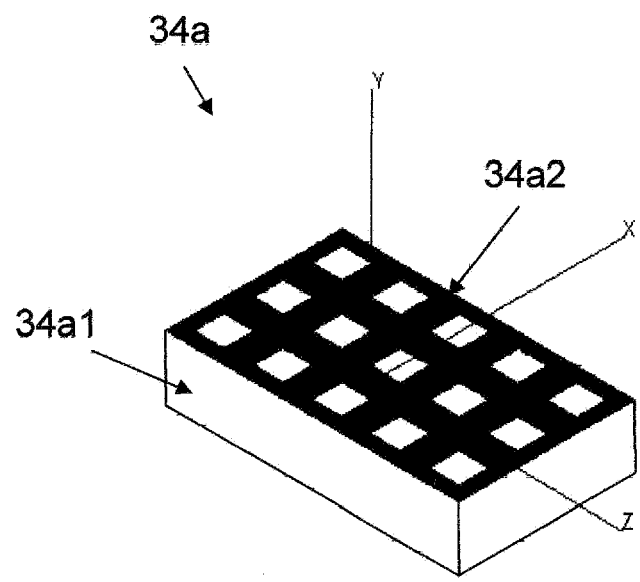
FIG. 2G shows a perspective view of the aperture array shown in FIGS. 2C and 2F.
Figure 2H:
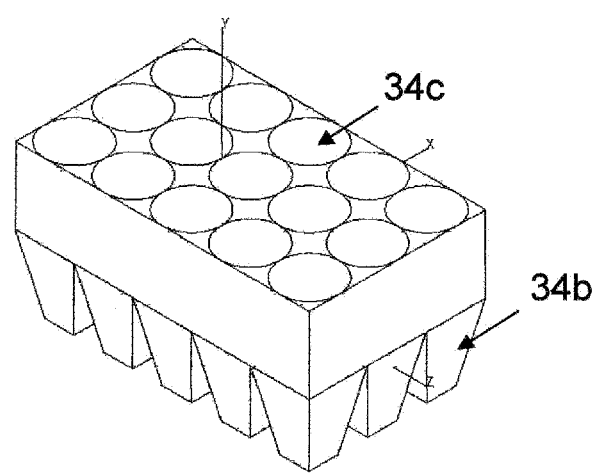
FIG. 2H shows a perspective view of the micro-waveguide and micro-lens arrays shown in FIGS. 2C and 2F.

FIG. 4A shows a cross-sectional view of the collection system 130 with the source 32 being oriented in the xy-plane rather than the yz-plane as shown in FIGS. 2A and 2E. FIG. 4B shows a cross-sectional view of the collection system 230 with the source 32 being oriented in the yz-plane and attached to the back side of the tunnel 33. Other orientations are possible but in general, it is preferable to align the cone angle of the majority of the radiation along the optical axis (i.e., the y-axis) in order to have better collimation and higher transmission efficiency.

Figure 4C:
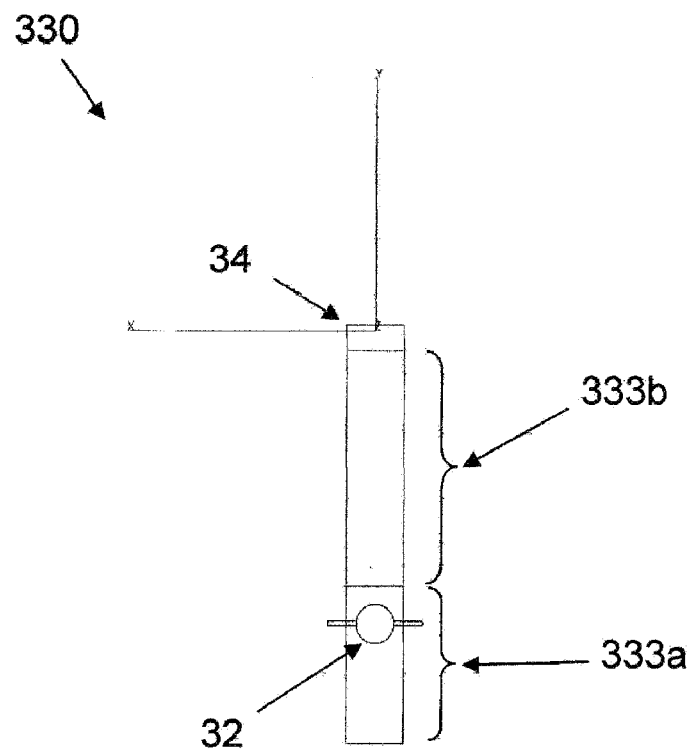
FIG. 4C shows a cross-sectional view (in the xy-plane) of a collection system utilizing a collimating plate, a light tunnel, a solid light pipe and a light source.
Figure 4D:
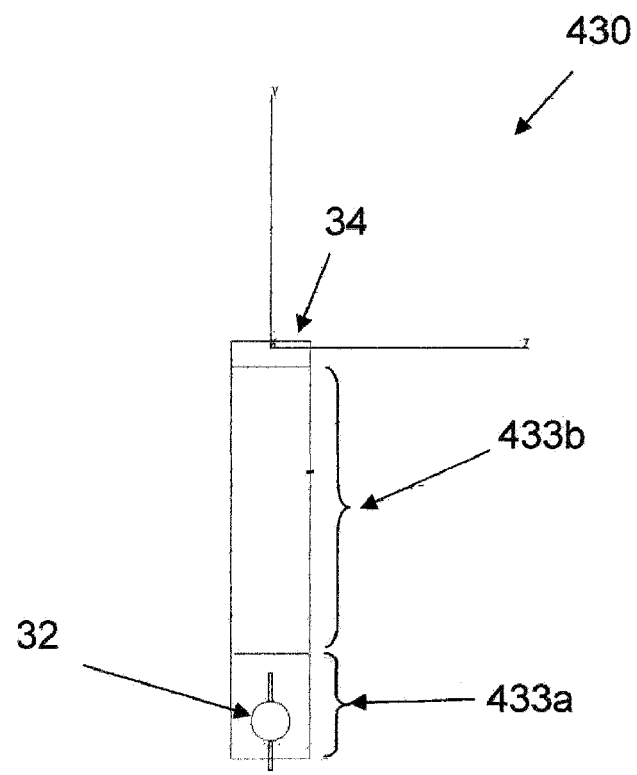
FIG. 4D shows a cross-sectional view (in the xy-plane) of a collection system utilizing a collimating plate, a light tunnel, a solid light pipe and a light source attached to the back side of the tunnel.

FIGS. 4C-D show, respectively, two other implementations of collection system 330 and 430 utilizing solid pipes 333b and 433b as well as hollow tunnels 333a and 433a. In such cases, the source 32 is placed (completely or partly) within the hollow tunnels 333a and 433a. Such arrangements make it easier to manufacture the source and tunnel as a separate unit, thus, allowing assembly of the collection systems using hollow tunnels or solid pipes with various lengths and sizes.

Figure 4E:
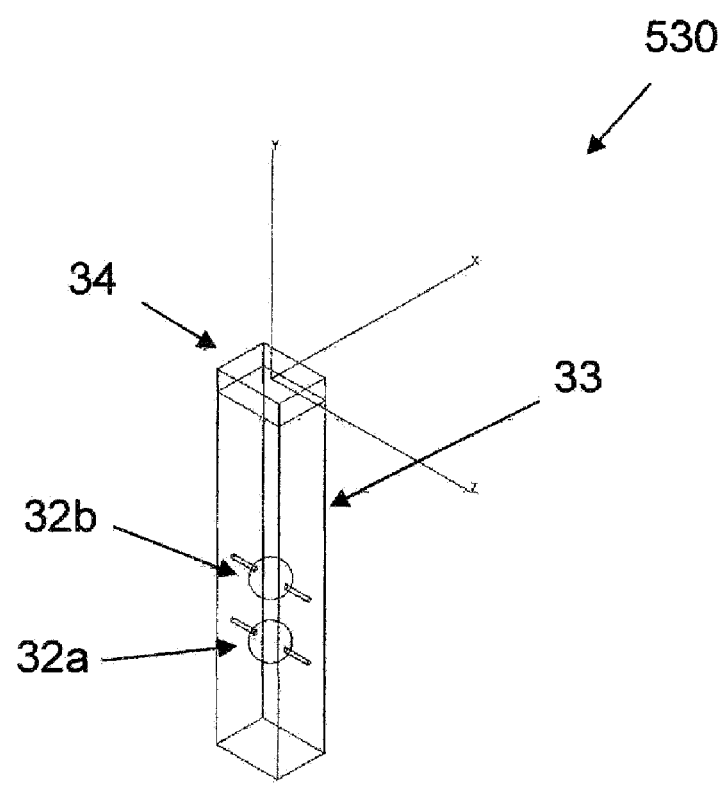
FIG. 4E shows a perspective view of a collection system utilizing two light sources and a light tunnel.

FIG. 4E shows a collection system 530 consisting of a collimating plate 34, tunnel 33 and two sources 32a and 32b connected serially within the tunnel 33. More than two sources can be placed serially or in parallel within the light tunnel 33. The serial connection is preferable since it does not require increasing the size of the cross section of the tunnel 33 to accommodate two or more sources connected in parallel. Increasing the cross section of the tunnel 33 increases the optical extent of delivered radiation and reduces the amount of radiation coupled to a target.

Figure 5A:
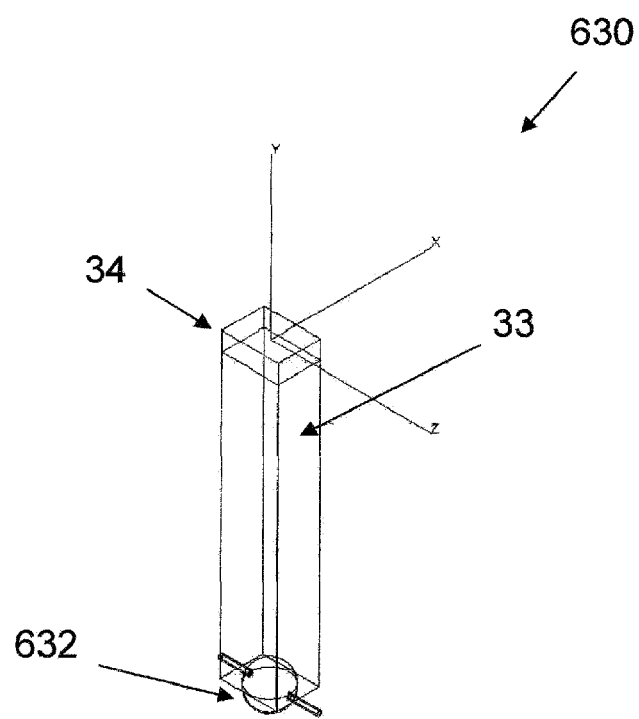
FIG. 5A shows a perspective view of a collection system utilizing a light source having a back reflector.
Figure 5B:
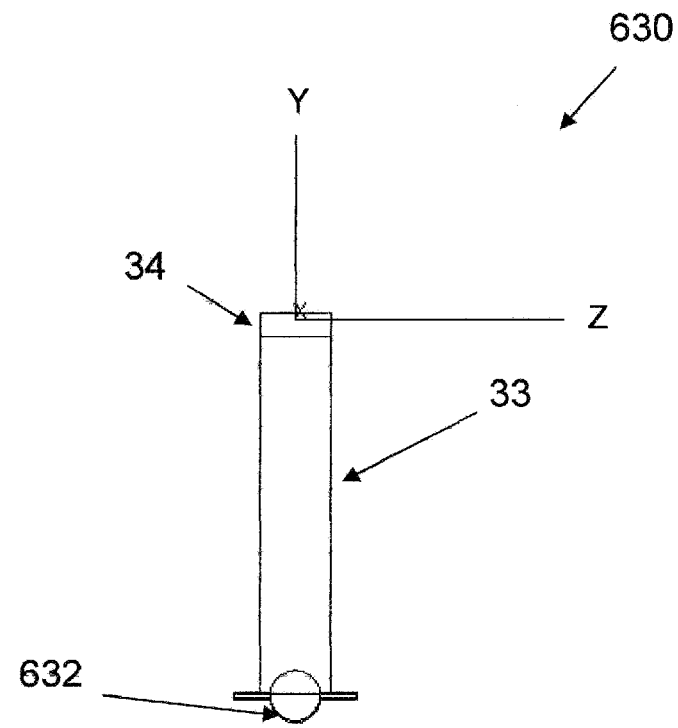
FIG. 5B shows a cross-sectional view (in the yz-plane) of the collection system of FIG. 5A.
Figure 5C:
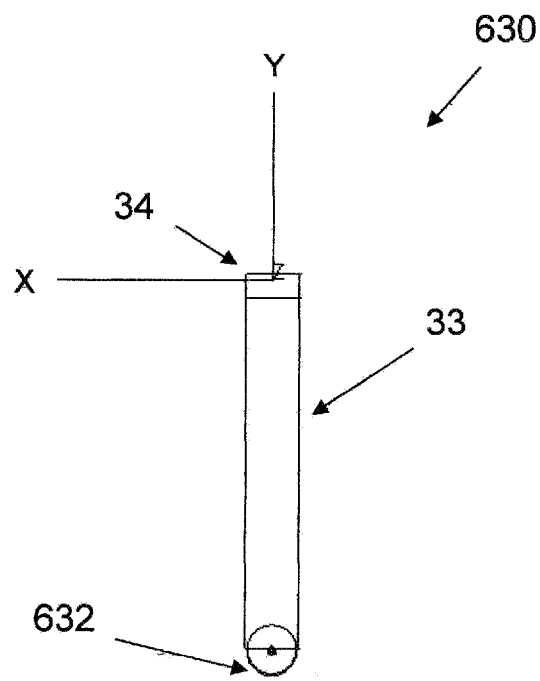
FIG. 5C shows a cross-sectional view (in the xy-plane) of the collection system of FIG. 5A.
Figure 5D:
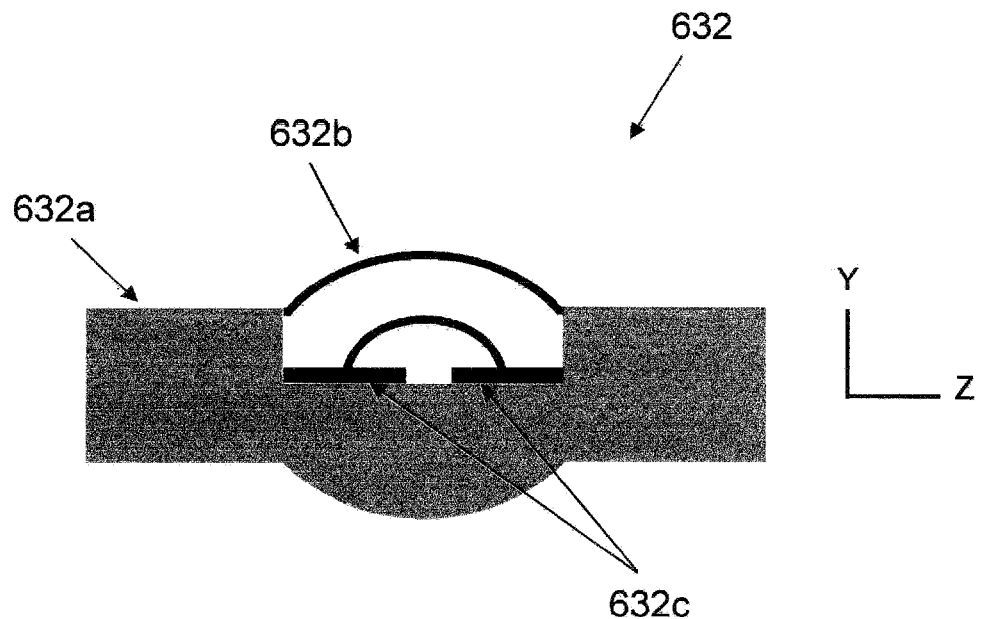
FIG. 5D shows a cross-sectional view (in the yz-plane) of the source of FIG. 5A.
Figure 5E:
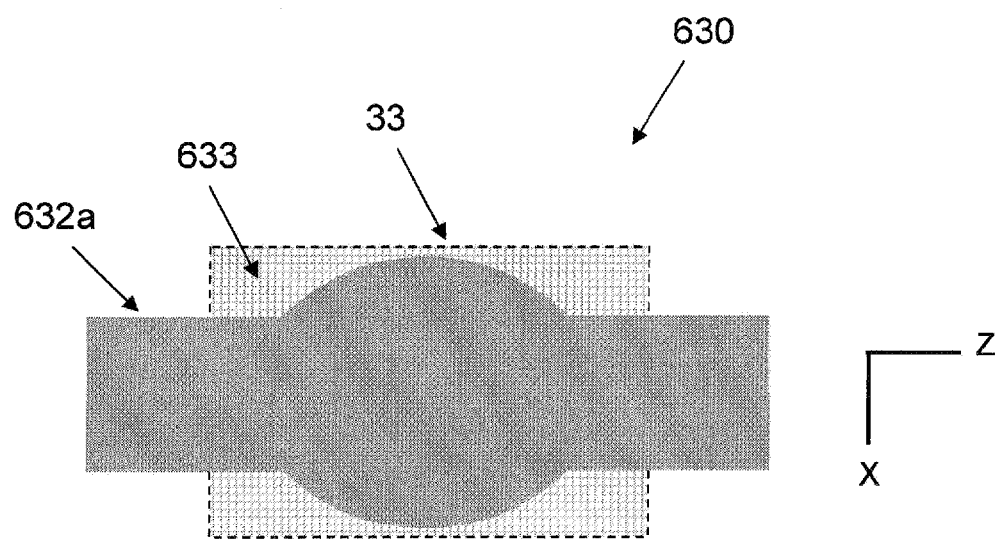
FIG. 5E shows a cross-sectional view (in the xz-plane) at the back side of the tunnel of the collection system of FIG. 5A.

FIGS. 5A-E show another collection system 630. The collection system 630 consists of a collimating plate 34, tunnel 33 and source 632, which is partly placed within the tunnel 33. FIGS. 5B and 5C show cross-sectional views of the system 630 in the yz-and xy-planes, respectively. FIG. 5D and 5E show cross-sectional views of the source 632 in the yz- and xz-planes, respectively. A reflective coating 632a is applied to the electrode sealing and to one-half the outside surface of the bulb 632b. The bulb's electrodes 632c are partially shown in FIG. 5D. In this case, the reflective coating on the bulb's surface focuses part of the radiation through the arc and toward the collimating plate 34. Radiation traveling toward the backside of the tunnel 33 is reflected back toward the collimating plate 34 either by the reflective coating 632a or by the reflective coating 633 on the back side of the tunnel 33 as shown in FIG. 5E.

Figure 6A:
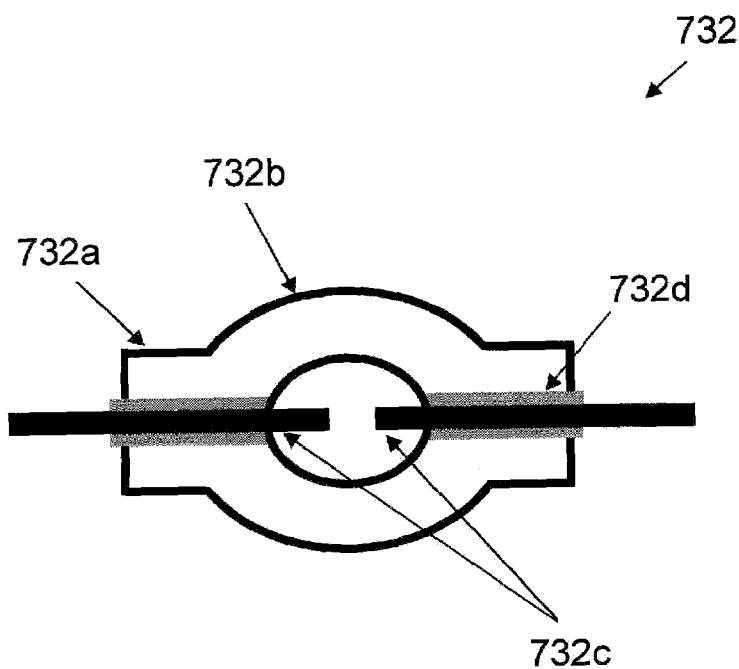
FIG. 6A-6C shows a cross-sectional view of the process of partly coating a source and its electrodes with a reflective coating.

FIGS. 6A-6D show the steps of applying a reflective coating (specular or diffuse) directly to the electrodes of an electroded arc lamp and the cross sections of the electrodes sealing. FIG. 6A shows an arc lamp 732 consisting of electrodes 732c, sealing 732a, reflective coating 732d and bulb 732b. The reflective coating 732d is first applied to part (or most) of the electrodes 732c then the sealing 732a is applied.

Figure 6B:
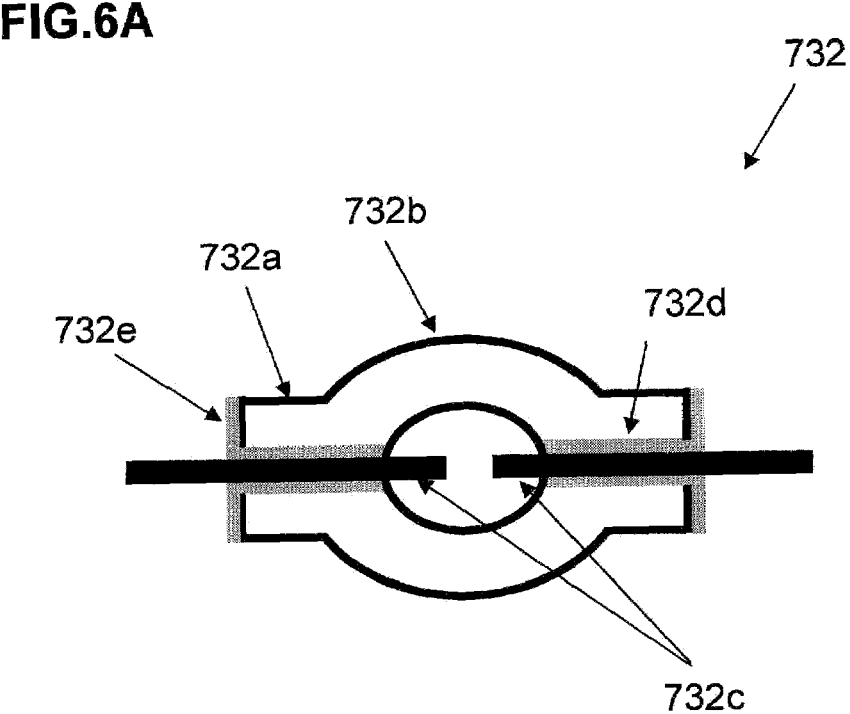
Figure 6C:
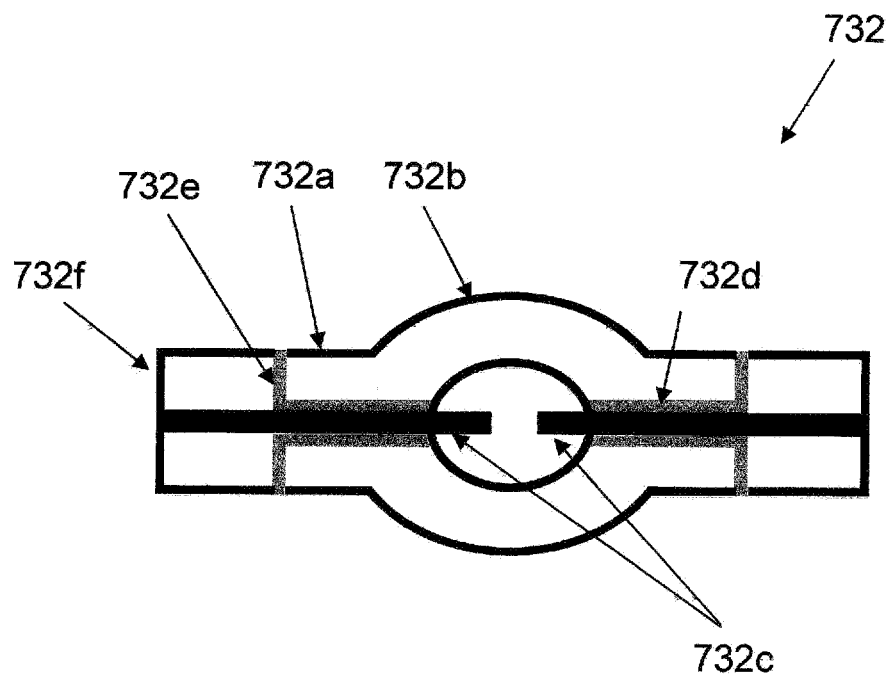
Figure 6D:
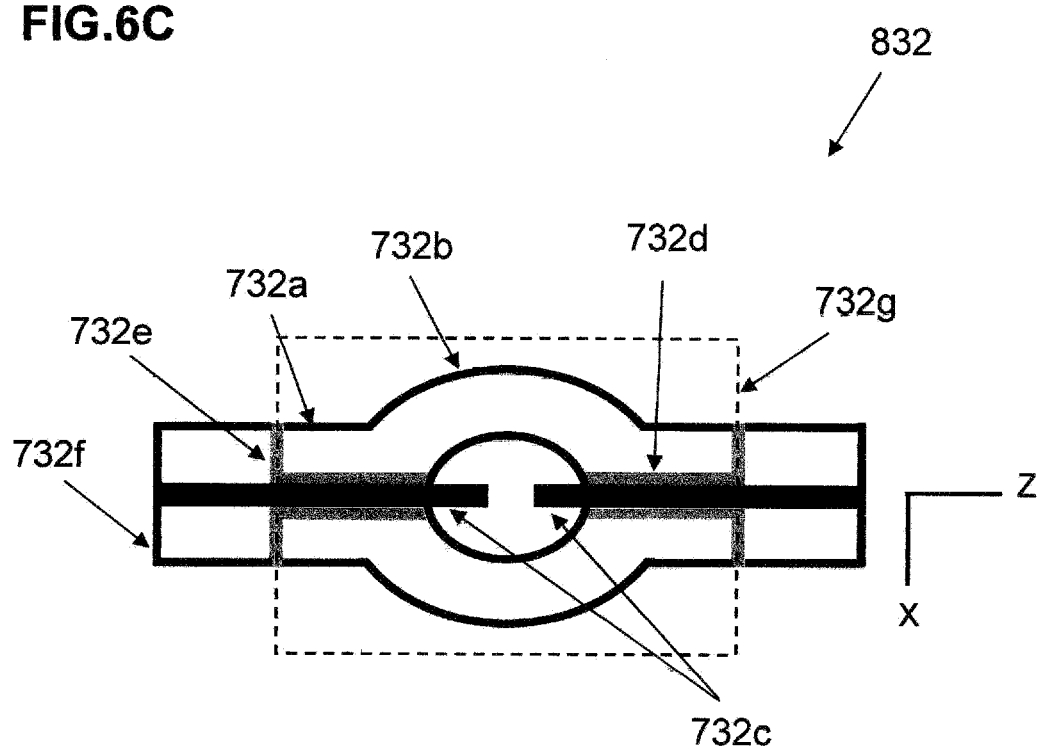
FIG. 6D shows a cross-sectional view of the source of FIG. 6C attached within a light tunnel.

FIG. 6B shows the application of the reflective coating 732e to the cross sections of the electrodes 732c. FIG. 6C shows the extension 732f of the electrodes sealing. FIG. 6D shows a cross-sectional view in xz-plane of a collection system 832 using the arc lamp 732 and a tunnel with a cross section 732g (the collimating plate is not shown).

Figure 6E:
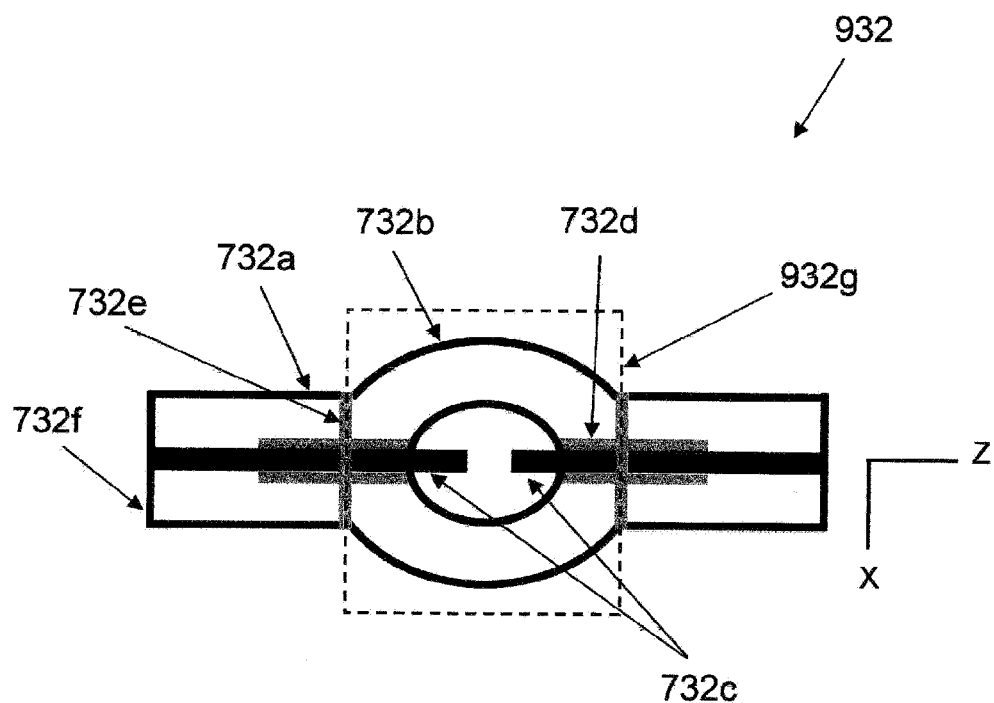
FIG. 6E shows a cross-sectional view of another variation of the source of FIG. 6C attached within a light tunnel.
Figure 6F:
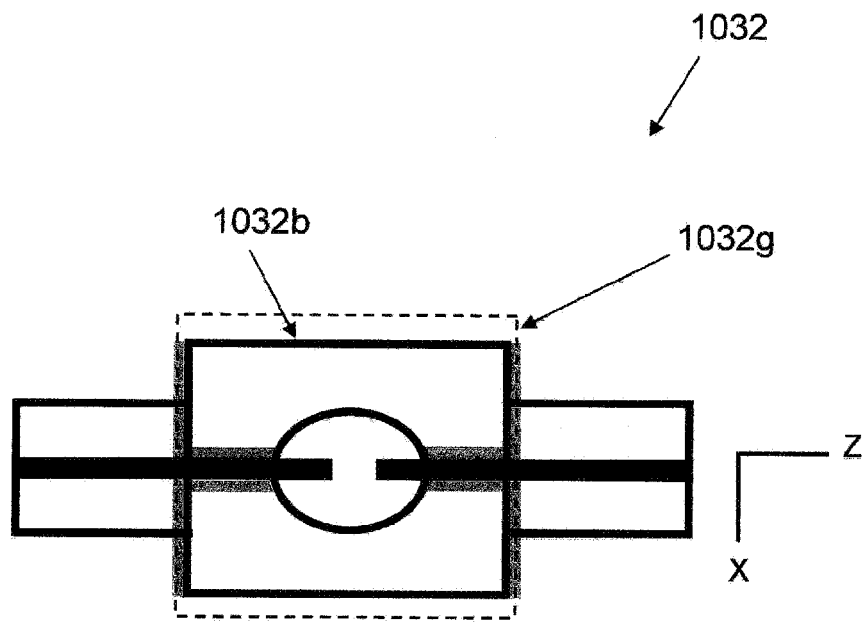
FIG. 6F shows a cross-sectional view of a source with a cylindrical bulb attached within a light tunnel.

The collection system 832 has the advantage of reducing radiation absorption by the electrodes and preventing radiation from exiting the collection system through the electrodes sealing. FIG. 6E shows a cross-sectional view in xz-plane of a collection system 932 using a tunnel with a smaller cross section 932g (the collimating plate is not shown). This size reduction is achieved by moving the reflective coating 732e closer to the bulb 732b. This collection system 932 has the advantage of reducing the optical extent of delivered radiation. FIG. 6F shows a cross-sectional view in xz-plane of a collection system 1032 (the collimating plate is not shown) utilizing a bulb 1032b of a cylindrical shape.

Figure 7:
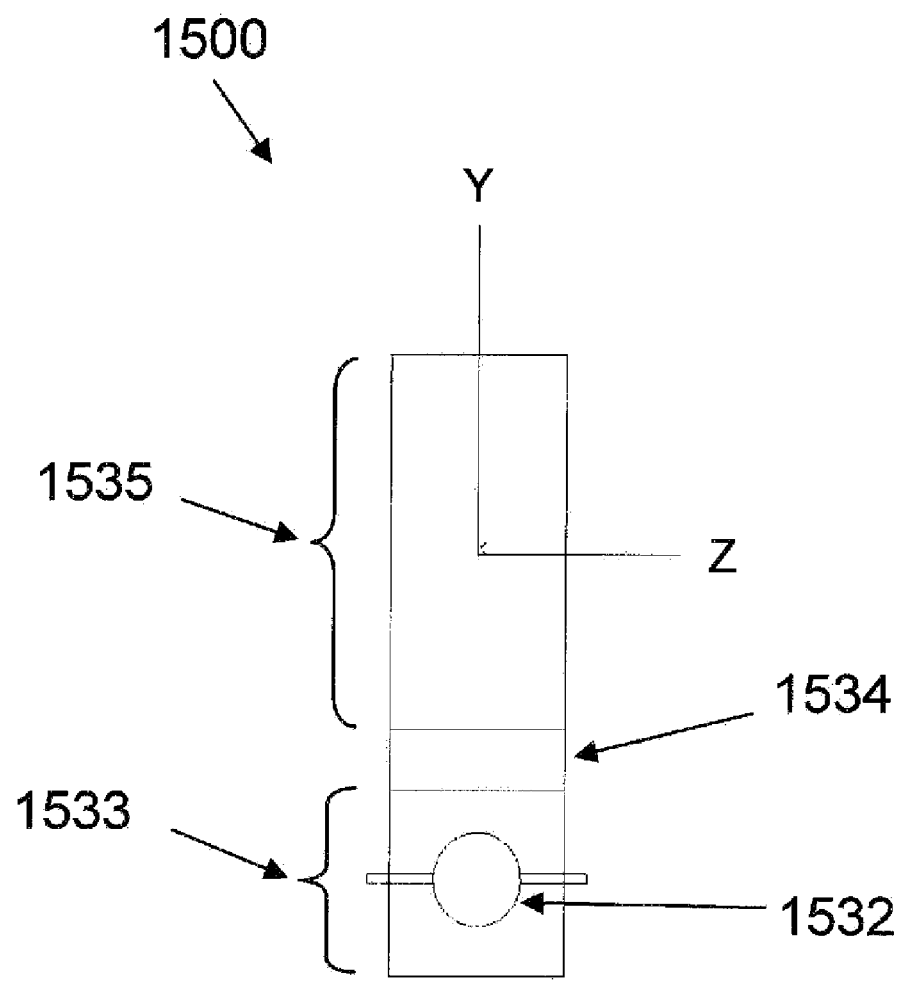
FIG. 7 shows a cross-sectional view (in the yz-plane) of a collection system providing light to a solid pipe or hollow tunnel.

FIG. 7 shows a collection and homogenization system 1500 comprises a collimating plate 1534, tunnel 1533, source 1532 and an optional solid pipe (or hollow tunnel) 1535. The short tunnel 1533 permits the conversion of the radiation with high angles (for example, near ±90° with respect to the optical axis or y-axis) to radiation with low angles (for example, near ±30° with respect to the optical axis or y-axis) via the collimating plate 1534 while reducing the absorption losses of high angled radiation at the tunnel's 1533 reflective sidewalls due to the reduction in its length. Optional tunnel 1535 receives radiation from collimating plate 1534 and delivers a more homogenous and uniform spatial distribution of radiation. The advantage of the system 1500 over collection systems 30, 130, 230, 330, and 430 is its lower losses.

Figure 8:
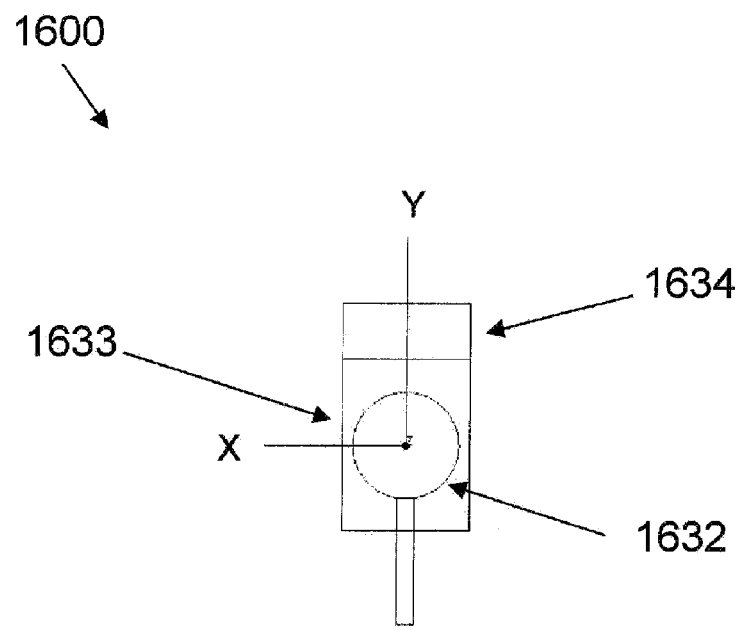
FIG. 8 is a cross-sectional view of a collection system suitable for an electrodeless lamp excited by microwave energy.

A collection system 1600 suitable for an electrodeless lamp excited by microwave energy is shown in FIG. 8. The collection system 1600 comprises a collimating plate 1634, tunnel 1633 and electrodeless lamp 1632. The collimating plate 1634 as well as the tunnel's 1633 sidewalls and backside and/or associated film coatings should be formed from materials which block the leakage of the microwave energy and pass light through the collimating plate's 1634 entrance aperture. For example, it is possible to have collimating plate 1634 and tunnel's 1633 sidewalls and backside made from a material (e.g., glass and quartz) that does not block microwave, but is coated with a film that blocks microwave energy. In addition, the aperture plate (which is part of the collimating plate 1634) as well as the tunnel's 1633 sidewalls and backside have to be coated with a highly reflective coating (specular or diffuse) in order block the leakage of light. It is preferable in some cases to block UV and IR radiations as well. U.S. Pat. No. 6,734,638 B2 to Hyung Joo Kang et al., U.S. Pat. No. 6,873,119 B2 to Jin-Joong Kim et al. and U.S. Pat. No. 6,791,270 B2 to Hyun Jung Kim et al., all of which are hereby incorporated by reference, provide examples of electrodeless microwave lamps that can be used in connection with the collection system 1600 presented in this patent.

Figure 9:
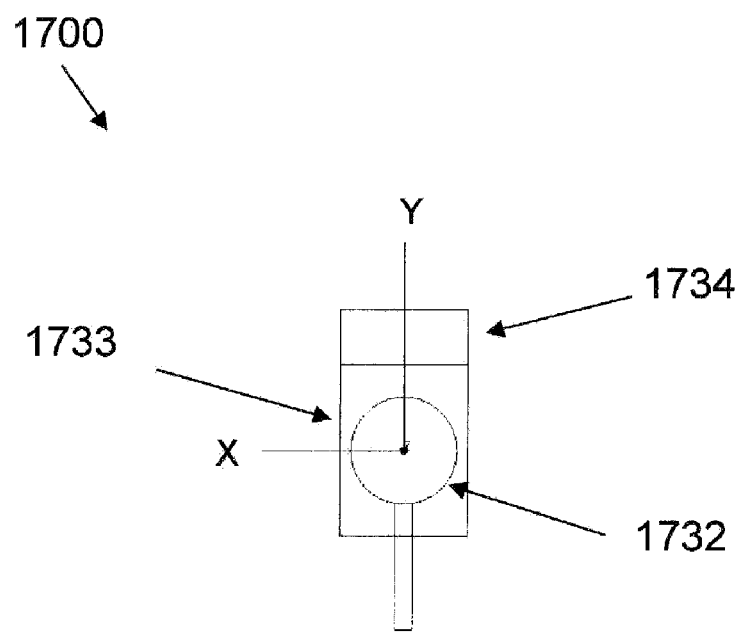
FIG. 9 is a cross-sectional view of a collection system suitable for an electrodeless lamp excited by high energy electromagnetic radiation.

A collection system 1700 suitable for an electrodeless lamp excited by high frequency electromagnetic energy is shown in FIG. 9. This collection system 1700 consists of a collimating plate 1734, tunnel 1733 and electrodeless lamp 1732. The tunnel's 1733 sidewalls and their coatings should be formed from materials which pass high frequency electromagnetic energy and block leakage of light. The tunnel's backside and collimating plate can be made from material that can block high frequency electromagnetic energy. U.S. Pat. No. 5,498,928 to Walter P. Lapatovich et al., which is hereby incorporated by reference, provides an example of electrodeless lamp excited by high frequency electromagnetic energy that can be used in connection with the collection system 1700 presented in this patent.

The reflective coating can be a metallic coating, dielectric coating, cold mirror coating, dichroic mirror coating, specular, diffuse or a combination of these. Tunnel 33 can be straight, tapered, cylindrical, square, rectangular, or spherical. Length of light guide ranges from few millimeters to tens of millimeters depending on the source size, size of tunnel's entrance and exit apertures, cone angle of radiation propagating within the tunnel 33 and degree of desired radiation uniformity delivered by the collection system 30, 130, 230, 330, 430, 530, 630, 832, 932, 1032 and 1500. The entrance and exit faces of tunnel 33, 33a, 333b, 433a, 433b, 732g, 932g, 1032g, 1533, and 1535 are independent in terms of size and shape and can have different sizes and different shapes such as square, rectangular, circular, trapezoidal, polygonal, asymmetrical and even irregular shapes. The tunnel sidewalls and backside can be made of materials such as glass, fused silica, quartz, metal, ceramic, and alumina. Metallic materials have good thermal conductivity and are preferable in case of electrodeless lamps of the microwave type where maintaining the microwave energy around the bulb is required.

While one or more specific embodiments of the invention have been described above, it will be apparent to those of ordinary skill in the art that many more embodiments are possible that are within the scope of the invention. Further, the foregoing summary, detailed description and drawings are considered as illustrative only of the principles of the invention. Since other modifications and changes may be or become apparent to those skilled in the art, the invention is not limited the exact constructions and operations shown and described above, and accordingly, all suitable modifications and equivalents are deemed to fall within the scope of the invention, the invention being defined by the claims that follow.

The invention claimed is:

1. A light collection system, comprising:
   a light tunnel having reflective walls for directing light to an exit face of the light tunnel;
   a light source located at least partially within the light tunnel, for emitting light, wherein the light source includes an electrodeless lamp;
   a film coating for blocking microwave energy emitted from the electrodeless lamp while passing visible light emitted from the electrodeless lamp; and
   a collimating plate positioned over at least a portion of the light tunnel's exit face, the collimating plate including:
   a light input surface in optical communication with the exit face;
   a light output surface from which collimated light is output from the light collection system;
   a plurality of hollow micro-tunnels located between the light input and output surfaces and arranged to receive and pass light emitted from the exit face, the hollow micro-tunnels outputting the collimated light wherein the collimated light is more collimated than the light received by the hollow micro-tunnels; and
   a partially reflective layer between the light input surface and the hollow micro-tunnels, for passing a portion of the light emitted from the exit face of the light tunnel into the hollow micro-tunnels and reflecting a portion of the light emitted from the exit face of the light tunnel back into the light tunnel so that the reflected light is recycled within the light tunnel.

2. The light collection system of claim 1, wherein the partially reflective layer includes a reflective coating having a plurality of light-transmissive apertures formed therein.

3. The light collection system of claim 2, wherein hollow micro-tunnels include an array of regularly spaced hollow waveguides, each hollow waveguide having an optical axis that is substantially orthogonal to the plane of collimating plate, an entrance aperture receiving light emitted from a corresponding light-transmissive aperture of the partially reflective layer, sidewalls and an exit face.

4. The light collection system of claim 2, further comprising a plurality light sources located within the light tunnel.

5. The light collection system of claim 1, wherein the collimating plate includes an aperture array having formed thereon the partially reflective layer.

6. The light collection system of claim 1, wherein the light tunnel includes one or more reflective sidewalls and a reflective back wall opposite the exit face.

7. The light collection system of claim 1, wherein the reflective walls include a reflective coating applied thereto.

8. The light collection system of claim 1, wherein the light tunnel is hollow, solid or a combination thereof.

9. The light collection system of claim 1, wherein the light source includes a reflective coating configured to direct light emitted from the light source toward the light tunnel's exit face.

10. The light collection system of claim 1, wherein the entrance and exit faces of the hollow micro-tunnels are about 5 µm-50 µm in diameter.

11. The light collection system of claim 1, wherein the collimation plate is substantially planar, has an area substantially equal to the exit face of the light tunnel.

12. The light collection system of claim 1, wherein the hollow micro-tunnels are configured to cause total internal reflection of light received thereby.

13. The light collection system of claim 1, wherein the internal sidewalls of the hollow micro-tunnels are coated with a reflective coating.

14. A method of producing collimated light, comprising:
   providing a light tunnel having reflective walls for directing light to an exit face of the light tunnel;
   providing a light source located at least partially within the light tunnel, for emitting light, wherein the light source is an electrodeless lamp;
   providing a film coating for blocking microwave energy emitted from the electrodeless lamp while passing visible light emitted from the electrodeless lamp;
   providing a collimating plate positioned over at least a portion of the light tunnel's exit face, the collimating plate including:
   a light input surface in optical communication with the exit face;
   a light output surface from which the collimated light is output;
   a plurality of hollow micro-tunnels located between the light input and output surfaces and arranged to receive and pass light emitted from the exit face, the hollow micro-tunnels outputting the collimated light wherein the collimated light is more collimated than the light received by the hollow micro-tunnels; and
   providing a partially reflective layer between the light input surface and the hollow micro-tunnels, for passing a portion of the light emitted from the exit face of the light tunnel into the hollow micro-tunnels and reflecting a portion of the light emitted from the exit face of the light tunnel back into the light tunnel so that the reflected light is recycled within the light tunnel, whereby producing the collimated light.

15. The method of claim 14, further comprising:
   providing a reflective coating on the light source configured to direct light emitted from the light source toward the light tunnel's exit face.

16. The method of claim 14, wherein hollow micro-tunnels include an array of regularly spaced hollow waveguides, each hollow waveguide having an optical axis that is substantially orthogonal to the plane of collimating plate, an entrance aperture receiving light emitted from a corresponding light-transmissive aperture of the partially reflective layer, sidewalls and an exit face.

17. The method of claim 14, wherein the internal sidewalls of the hollow micro-tunnels are coated with a reflective coating.

* * * * *